United States Patent
Hovden

(10) Patent No.: US 7,602,976 B2
(45) Date of Patent: Oct. 13, 2009

(54) COMPRESSIBLE EARTH MOVER'S DISTANCE

(75) Inventor: Gunnar Hovden, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 762 days.

(21) Appl. No.: 11/356,880

(22) Filed: Feb. 17, 2006

(65) Prior Publication Data

US 2007/0196032 A1    Aug. 23, 2007

(51) Int. Cl.
*G06K 9/36* (2006.01)

(52) U.S. Cl. ..................................... 382/232

(58) Field of Classification Search ................. 382/100, 382/165, 181, 305; 345/418–420, 619, 621; 707/3–7, 10, 100, 102, 104.1; 715/721, 723
See application file for complete search history.

(56) References Cited

U.S. PATENT DOCUMENTS

| | | | | |
|---|---|---|---|---|
| 5,136,655 | A | | 8/1992 | Bronson ..................... 381/41 |
| 5,539,841 | A | * | 7/1996 | Huttenlocher et al. ....... 382/218 |
| 5,999,653 | A | * | 12/1999 | Rucklidge et al. ........... 382/227 |
| 6,285,805 | B1 | * | 9/2001 | Gueziec ..................... 382/299 |
| 6,335,768 | B1 | | 1/2002 | Reinold et al. ............. 348/723 |
| 6,562,077 | B2 | | 5/2003 | Bobrow et al. ............. 715/517 |
| 6,594,629 | B1 | | 7/2003 | Basu et al. .................. 704/251 |
| 6,611,803 | B1 | | 8/2003 | Furuyama et al. .......... 704/254 |
| 6,633,844 | B1 | | 10/2003 | Verma et al. ............... 704/251 |
| 6,710,822 | B1 | * | 3/2004 | Walker et al. .............. 348/722 |
| 6,748,115 | B1 | | 6/2004 | Gross ......................... 382/237 |
| 6,760,724 | B1 | * | 7/2004 | Chakrabarti et al. .......... 707/4 |
| 7,031,980 | B2 | * | 4/2006 | Logan et al. ............. 707/104.1 |
| 7,292,728 | B1 | * | 11/2007 | Gupta et al. ................ 382/232 |
| 7,463,769 | B2 | * | 12/2008 | Lin et al. .................... 382/169 |
| 7,477,780 | B2 | * | 1/2009 | Boncyk et al. ............. 382/165 |
| 2001/0042114 | A1 | | 11/2001 | Agraharam et al. ......... 709/223 |
| 2002/0006266 | A1 | | 1/2002 | Yoon et al. .................... 386/69 |
| 2005/0102107 | A1 | | 5/2005 | Porikli ........................ 702/20 |
| 2006/0041375 | A1 | | 2/2006 | Witmer et al. .............. 701/208 |

OTHER PUBLICATIONS

Yossi Rubner et al., "A Metric for Distributions with Applications to Image Databases", Proceedings of the 1998 IEEE International Conference on Computer Vision, Bombay, India, 8 pages.
D.P. Huttenlocher et al., "Comparing Images Using the Hausdorff Distance", IEEE Transactions on Pattern Analysis and Machine Intelligence, vol. 15, No. 9, pp. 850-863, Sep. 1993.
R.E. Tarjan, "Data Structures and Network Algorithms", 1983.

* cited by examiner

*Primary Examiner*—Jose L Couso
(74) *Attorney, Agent, or Firm*—Haverstock & Owens LLP

(57) ABSTRACT

A Compressible Earth Mover's Distance (CEMD) better matches how humans perceive distance between distributions. Earth and holes are able to be compressed when moving from the earth to the holes thus minimizing the distance and improving the quality of image comparison. CEMD is utilized in a number of implementations, for instance, content based image retrieval, color query and other applications in multimedia. Another implementation includes using CEMD with a content recognition system for indexing occurrences of objects within an audio/video content data stream which processes the stream of data to generate a content index database corresponding to the content stream. CEMD is usable with in a variety of systems to assist in image recognition.

45 Claims, 6 Drawing Sheets

COMPRESSIBLE EARTH MOVER'S DISTANCE

FIELD OF THE INVENTION

The present invention relates to the field of image matching. More specifically, the present invention relates to an improved method of image matching using a Compressible Earth Mover's Distance.

BACKGROUND OF THE INVENTION

For a user to search for images, the images are generally stored in databases with corresponding text phrases such as titles, keywords or captions. The user's search is then based on an entered keyword, and the search returns images if the entered keyword matches one of the text phrases. However, with larger sets of image data, it becomes impractical to store all of the images with text indexes to correspond with each image. It is also highly burdensome for someone to manually attribute specific titles, keywords and captions to each one. Furthermore, text-based searches have their inherent drawbacks as well. To overcome the limitations of text searches, attempts have been made to utilize image-based searches.

Earth Mover's Distance (EMD) is a distance between two distributions, which reflects the minimal amount of work that must be performed to transform one distribution into the other by moving "distribution mass" around. There have been projects implementing EMD in a variety of applications including applications with image databases, specifically color and texture.

U.S. Pat. No. 6,710,822 to Walker, et al. discloses providing an image-voice processing apparatus for search based on the similarity of segments of various levels in various video data. Walker further discloses standards for measuring dissimilarity including using the EMD in the case of color short messages for still pictures in applications of the distance measuring method.

U.S. Pat. No. 6,760,724 to Chakrabarti, et al. discloses a method for querying electronic data. The query method comprises creating wavelet-coefficient synopses of the electronic data and then querying the synopses in the wavelet-coefficient domain to obtain a wavelet-coefficient query result. The wavelet-coefficient query result is then rendered to provide an approximate result. The EMD error metric was used for computing the dissimilarity between two distributions of points and applied to computing distances between images in a database. The idea was to formulate the distance between two (multi)sets as a bipartite network flow problem, where the objective function incorporates the distance in the values of matched elements and the flow captures the distribution of element counts.

However, the problem with EMD and other existing methodologies is that they do not always correspond to how humans perceive the distance between two distributions.

SUMMARY OF THE INVENTION

A Compressible Earth Mover's Distance (CEMD) better matches how humans perceive distance between distributions. Earth and holes are able to be compressed when moving from the earth to the holes thus minimizing the distance and improving the quality of image comparison. CEMD is utilized in a number of implementations, for instance, content based image retrieval, color query and other applications in multimedia. Another implementation includes using CEMD with a content recognition system for indexing occurrences of objects within an audio/video content data stream which processes the stream of data to generate a content index database corresponding to the content stream. CEMD is usable with in a variety of systems to assist in image recognition.

In one aspect, a system for comparing two images comprises a first image, a second image to be compared with the first image and a program to determine a compressible earth mover's distance to compare the first image with the second image, wherein the compressible earth mover's distance is calculated by compressing one or more earths and one or more holes when appropriate and determining the work required to move the one or more earths to the one or more holes wherein the one or more earths and the one or more holes correspond to colors of the first image and the second image. A keyword is used to determine the second image to compare. Alternatively, the second image is selected by a user. The shorter the compressible earth mover's distance, the more similar the first image and the second image are. The first image and the second image are compared over the Internet. Alternatively, the first image and the second image are compared on a computing device selected from the group consisting of a personal computer, laptop, digital camera, digital camcorder, handheld, iPod® and home entertainment system.

In another aspect, a method of comparing a first image with a second image, wherein comparing comprises calculating a compressible earth mover's distance by compressing one or more earths and one or more holes when appropriate and determining the work required to move the one or more earths to the one or more holes wherein the one or more earths and the one or more holes correspond to colors of the first image and the second image. A keyword is used to determine the second image to compare. Alternatively, the second image is selected by a user. The shorter the compressible earth mover's distance, the more similar the first image is to the second image. Comparing occurs via the Internet. Alternatively, comparing occurs on a computing device selected from the group consisting of a personal computer, laptop, digital camera, digital camcorder, handheld, iPod® and home entertainment system.

In yet another aspect, a system for locating data comprises an image, one or more sets of data and a program to search for the image wherein the search determines a compressible earth mover's distance to compare the image with the one or more sets of data, further wherein the compressible earth mover's distance is calculated by compressing one or more earths and one or more holes when appropriate and determining the work required to move the one or more earths to the one or more holes wherein the one or more earths and the one or more holes correspond to colors of the image and the one or more sets of data. The one or more sets of data are selected from the group consisting of images and videos. The program uses a keyword to determine the image to compare. Alternatively, the program uses the image selected by a user to compare. The program retrieves the one or more sets of data which are similar to the image. The program lists the one or more sets of data according to similarity to the image. The smaller the compressible earth mover's distance, the more similar the image is to the one or more sets of data. The program searches over the Internet. The program searches on a computing device selected from the group consisting of a personal computer, laptop, digital camera, digital camcorder, handheld, iPod® and home entertainment system.

In another aspect, a method of locating one or more images comprises selecting a first image to search for, comparing the first image with one or more second images, wherein comparing comprises calculating a compressible earth mover's distance by compressing one or more earths and one or more holes when appropriate and determining the work required to move the one or more earths to the one or more holes wherein the one or more earths and the one or more holes correspond to colors of the first image and the one or more second images and retrieving the one or more second images that are similar to the first image. The method further comprises representing the first image and the one or more second images in a color model. The color model is CIE L*a*b*. Alternatively, any appropriate color model is used. Selecting comprises entering in a keyword upon which an image matching that keyword is utilized to compare. Alternatively, selecting is performed by a user. The method further comprises listing the one or more second images according to similarity to the first image. A smaller compressible earth mover's distance means a higher similarity between the first image and the one or more second images. Comparing and retrieving occurs via the Internet. Alternatively, comparing and retrieving occurs on a computing device selected from the group consisting of a personal computer, laptop, digital camera, digital camcorder, handheld, iPod® and home entertainment system.

In yet another aspect, a method of locating one or more images comprises selecting a first image to search for, comparing the first image with one or more second images stored in a database, calculating a compressible earth mover's distance between the first image and the one or more second images by compressing one or more earths and one or more holes when appropriate and determining the work required to move the one or more earths to the one or more holes wherein the one or more earths and the one or more holes correspond to colors of the first image and the one or more second images, retrieving the one or more second images wherein the compressible earth mover's distance is within a specified limit and listing the one or more second images in order of similarity to the first image. The method further comprises representing the first image and the one or more second images in a color model. The color model is CIE L*a*b*. Alternatively, any appropriate color model is used. Selecting comprises entering in a keyword upon which an image matching that keyword is the first image. Alternatively, selecting is performed by a user. A smaller compressible earth mover's distance means a higher similarity between the first image and the one or more second images. The one or more second images are retrieved via the Internet. Alternatively, the one or more second images are retrieved on a computing device selected from the group consisting of a personal computer, laptop, digital camera, digital camcorder, handheld, iPod® and home entertainment system.

In another aspect, an apparatus for processing a content stream comprises means for processing a content stream to determine occurrences of one or more objects within the content stream, wherein the objects comprise one or more of shapes and objects, further wherein the means for processing determines a compressible earth mover's distance and means for generating an entry coupled to the means for processing for generating an entry for each occurrence of the one or more objects, the entry including an object identifier and a corresponding location of the occurrence of the object within the content stream. The content stream includes one or more of an audio component and a video component.

In yet another aspect, an apparatus to process a content stream comprises a processing engine to process a content stream to determine occurrences of one or more objects within the content stream by determining a compressible earth mover's distance, wherein the objects comprise one or more of shapes and objects and a controller coupled to the processing engine to generate an entry for each occurrence of the one or more objects, the entry including an object identifier and a corresponding location of the occurrence of the object within the content stream. The content stream includes one or more of an audio component and a video component.

In another aspect, a method of computing the distance between a first and a second image comprises representing the first image in a color model, representing the second image in the color model, determining the size of one or more earths, wherein the one or more earths are derived from the first image, determining the size of one or more holes, wherein the one or more holes are derived from the second image, moving the one or more earths to the one or more holes, compressing the one or more earths to minimize the distance between the first image and the second image, compressing the one or more holes to minimize the distance between the first image and the second image and determining a work amount based on the distance between the first image and the second image. The color model is CIE L*a*b*. Alternatively, any appropriate color model is used.

DETAILED DESCRIPTION OF THE PREFERRED EMBODIMENT

An augmentation to the EMD which is referred to as Compressible Earth Mover's Distance (CEMD) is described.

Figure 1:
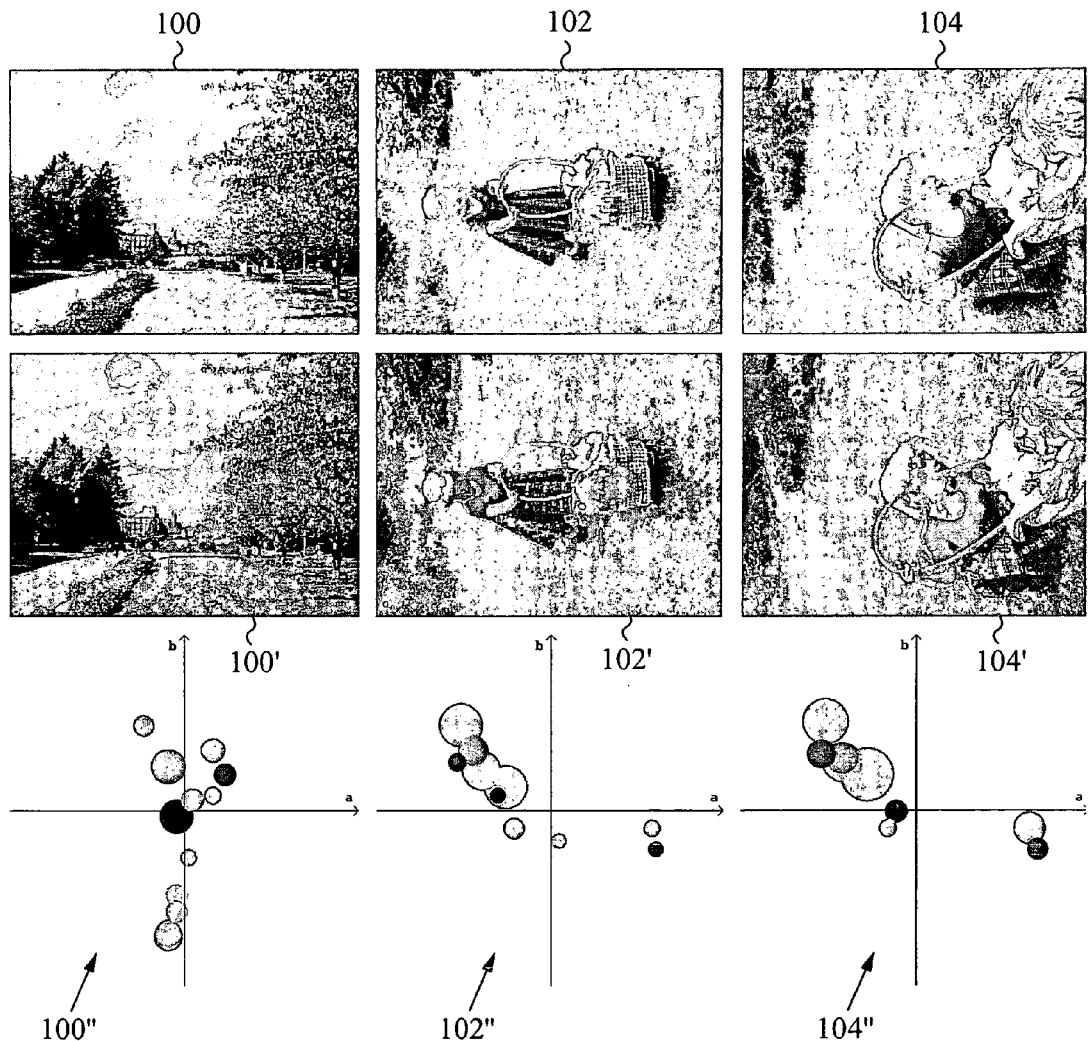
FIG. 1 illustrates three images in their original form, after color reduction form and CIE L*a*b* color space form.

The following is an example of how EMD or CEMD are used in Content Based Image Retrieval (CBIR) where the object is to find the distance between two images. The distance between two images indicates how different the two images look. FIG. 1 shows three images. The top row shows the original images 100, 102 and 104. In this example, the middle row shows the images after the number of colors has been reduced to eleven to thirteen, 100', 102' and 104'. The bottom row shows the colors contained in the images represented in CIE L*a*b* color space where the size of each circle is proportional to the amount of that color in the images, 100", 102" and 104". The center of each circle is located at the coordinate that corresponds to the color in L*a*b* space. CIE L*a*b* is a color model used to describe all of the colors visible to the human eye. The first of the three parameters in the model represents the luminance of the color wherein L*=0 indicates black and L*=100 indicates white. The position between red and green is indicated in "a*" wherein negative values indicate green and positive values indicate red. The position between blue and yellow is indicated in "b*" wherein negative values indicate blue and positive values indicate yellow. The L* value is omitted for clarity, here. The distance between images is calculated based on the color distribution shown in the bottom row of FIG. 1. EMD is one way of calculating the distance between two distributions. CEMD is an advanced way of calculating the distance between the two distributions.

Figure 2:
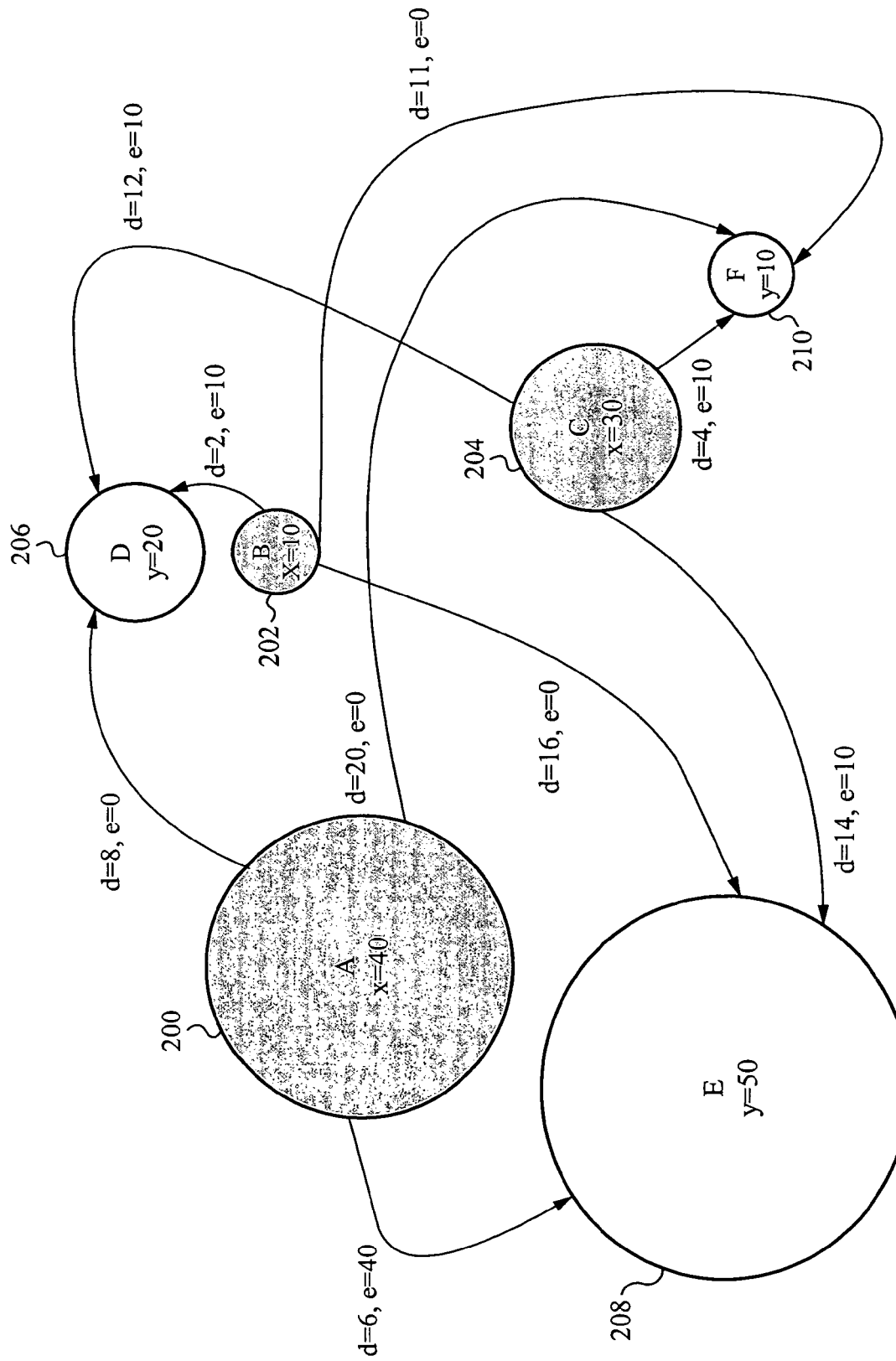
FIG. 2 illustrates a graphical representation of holes and earth including sizes and distances.

Intuitively, given two distributions, one is able to be seen as a mass of earth properly spread in space, the other as a collection of holes in that same space. It is assumed that there is the same amount of earth and holes, if not, either the holes or the earth are able to be scaled to fit the other. The EMD measures the least amount of work needed to fill the holes with earth. A unit of work corresponds to transporting a unit of earth by a unit of (ground) distance. For example, FIG. 2 illustrates graphical representations of holes and earth. The open circles represent holes. The shaded circles represent earth. The Euclidian distances between the circles are the distances used when calculating the EMD. When calculating the CEMD, the distances and sizes of the holes and earth are similarly used, but with modifications described further below. Distances are denoted d, and the earth moved is denoted e. The amount of earth is denoted x, and the sizes of the holes are denoted y.

The EMD can be expressed as:

$$EMD = \min \sum_{i \in I} \sum_{j \in J} d_{ij} e_{ij} \qquad (1)$$

where:
I is the set of earth
J is the set of holes
$d_{ij}$ is the distance between earth $i \in I$ and hole $j \in J$
$e_{ij}$ is the amount of earth moved from earth $i \in I$ to hole $j \in J$ constraints:

$$d_{ij} \geq 0 \qquad (2)$$

$$\sum_i e_{ij} = y_j \qquad (3)$$

$$\sum_j e_{ij} = x_i \qquad (4)$$

where:
$x_i$ is the size of earth $i \in I$ $y_j$ is the size of hole $j \in J$

Equation (2) ensures that there are no negative distances. Equation (3) prevents moving more earth to a hole than the size of the hole. Equation (4) prevents moving more earth from a location than the amount of earth at that location. For example, in FIG. 2, using the equations and restrictions above, the earth A 200, of size 40 is moved a distance of 6 to hole E 208 with a hole size of 50. Since that moves all of earth A 200 to a hole, earth A 200 is not moved to any other holes. But hole E 208 has a hole size of 50 and only 40 has been used, so it is able to receive more earth. Earth B 202 of size 10 is moved a distance of 2 to hole D 206 with a hole size of 20. That moves all of earth B 202 to a hole, so earth B is not moved to any other holes. Hole D 206 still has space for more earth. Only 10 units of Earth C 204 of size 30 are moved a distance of 4 to hole F 210 because hole F 210 is only size 10. The rule that a hole cannot receive more earth than its size must be followed. Thus, another 10 of Earth C 204 goes a distance of 14 to hole E 208 since it still had space after earth A 200. Also, the other 10 of Earth C 204 goes a distance of 12 to hole D 206 which had space after earth B 202. Ultimately, the EMD is:

EMD=6·40+2·10+14·10+4·10+12·10=240+20+140+ 40+120=560 which is how much work was required to move the earth to the holes. More practically, it determines how dissimilar two images are, wherein the lower the work, the more similar they are.

The following paragraph describes one example where the EMD is not a good measure for similarity of images. One use of EMD is to compare color histograms for the purpose of determining the distance between two color images. Similar images are expected to have a small distance, while very different images are expected to have a large distance. In the example illustrated in FIG. 3, most humans would say that the two images are similar. By computing the EMD between the color histograms for two images, it shows that the red 302 in image A 300 has a zero distance to the red 312 in image B 310, hence all the red mass 302 in A 300 is able to be moved to the red hole 312 in B 310 without contributing to the EMD. Similarly, part of the green mass 304 in A 300 is able to be moved to the green hole 314 in B 310 without contributing to the EMD. What is left then is a lot of green mass 304 in A 300 which has to be moved a very long distance (red and green are very different colors on the CIE L*a*b* color space, hence the distance between red and green is very large) to fill the red hole 312 in B 310. The EMD is going to be very big, despite the fact that most people perceive the two images as being similar. Hence, for a use such as image matching for image retrieval, EMD would not perform well.

The problem with EMD is that it does not always correspond to how humans perceive the distance between two distributions. A modification to EMD called Compressible Earth Mover's Distance (CEMD) that better matches how humans perceive distance between distributions is described herein in the embodiments. The fundamental difference between EMD and CEMD is that using CEMD, earth and holes may be compressed when moving the earth to the holes. There is, however, a penalty for compressing earth and holes.

Figure 3:
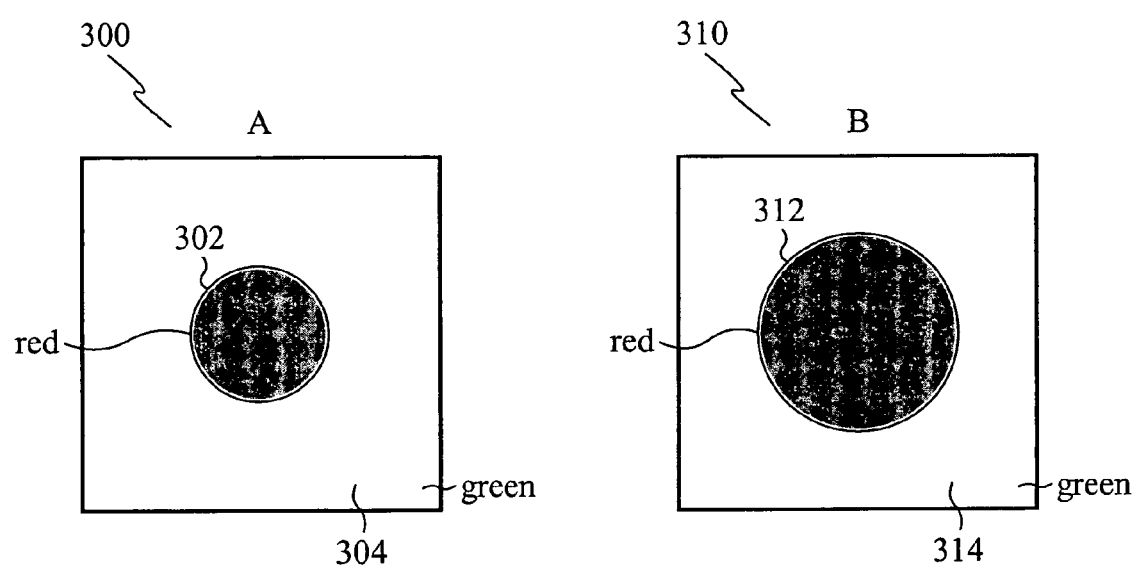
FIG. 3 illustrates graphical representations of holes and earth.

When using CEMD to compute the distance between image A 300 and image B 310 in FIG. 3, all the red mass 302 in A 300 will be moved to the hole 312 in B 310 and the hole 312 in B 310 will be compressed to exactly fit the red mass 302 from A 300. There is a small penalty for compressing the red hole 312 in B 310. Similarly all the green mass 304 in A 300 will be compressed to fit the green hole 314 in B 310. There is a small penalty for compressing the green mass 304. The penalty for compressing the hole 314 in B 310 and the mass 304 from A 300 is the only thing contributing to the CEMD, because no mass has to be moved from red to green or from green to red. The CEMD will therefore be fairly low, which corresponds well with how humans perceive the distance or difference between A 300 and B 310.

The CEMD can be expressed as:

$$CEMD = \min \left\{ \sum_{i \in I} \sum_{j \in J} d_{ij} e_{ij} + \sum_{i \in I} \begin{cases} 0, & \text{if } \sum_{j \in J} e_{ij} \leq x_i \\ \alpha \left( \dfrac{\sum_{j \in J} e_{ij}}{x_i} - 1 \right), & \text{otherwise} \end{cases} \right. + \qquad (5)$$

-continued $$\sum_{j \in J} \begin{cases} 0, & \text{if } \sum_{i \in I} e_{ij} \leq y_i \\ \alpha \left( \frac{\sum_{i \in I} e_{ij}}{x_i} - 1 \right), & \text{otherwise} \end{cases}$$

where:

I is the set of earth

J is the set of holes $d_{ij}$ is the distance between earth $i \in I$ and hole $j \in J$ $e_{ij}$ is the amount of earth moved from earth $i \in I$ to hole $j \in J$ $x_i$ is the size of earth $i \in I$ $y_j$ is the size of hole $j \in J$ $\alpha$ is a positive constant for penalizing compression of earth and holes constraints:

$$d_{ij} \geq 0 \qquad (6)$$

Note that constraints (3) and (4) for the EMD, which prevent moving more earth to a hole than the size of the hole and prevent moving more earth from a location than the amount of earth at that location, respectively, are not valid for CEMD. The last two terms in (5) are the penalty for compressing earth and holes. The more the earth or hole is compressed, the higher the penalty.

One of the applications CEMD is able to be utilized for is Content-Based Image Retrieval (CBIR) also known as Query By Image Content (QBIC) and Content-Based Visual Information Retrieval (CBVIR). CBIR is the application of computer vision to the image retrieval problem of searching for digital images in large databases. "Content-based" means that the search uses the contents of the images themselves, rather than relying on metadata such as titles, captions or keywords. CBIR is needed and useful because of the limitations in metadata-based systems in addition to the increased bandwidth and processing power of the Internet. Textual information about images is easily searched using current technology, but requires those descriptions to be input by someone, which is highly burdensome and impractical when dealing with extremely large amounts of data. Furthermore, keyword searches for text have their own drawbacks such as requiring a user to accurately phrase his search, otherwise the search could result in nothing found.

CBIR systems are implemented in a number of different ways. One example permits a user to make a request, similar to a keyword search, such as "rabbit" and any images of rabbits are retrieved. However, unlike a keyword search where the word "rabbit" is searched for, the search looks for matching characteristics of an image that has a rabbit. Other systems search for texture, color and shape or even faces. The search could begin with a sample image provided by the user or via specifications of color schemes and textures. The results are returned in a variety of ways, and in some embodiments, they are sorted in ascending order starting with the smallest distance which correlates to the closest match. Another method of returning results only returns those images whose distance falls within a designated acceptable range. Of course, the accuracy of the search depends on how well the technology is able to match the user's image with those in the database. CEMD is able to improve accuracy of a user's search as described above.

Alternatively, instead of the search being across the Internet, CBIR implementing CEMD is performed on a local intranet or even on a user's computing device such as a personal computer, laptop, digital camera, digital camcorder, handheld, iPod® and home entertainment system. For example, if a user wants to find all of their baby pictures on the computer, they are able to use the aforementioned technologies and retrieve all pictures that resemble a baby.

Another application CEMD is utilized with is a content recognition system. The content recognition system for indexing occurrences of objects within an audio/video content data stream processes the stream of data to generate a content index database corresponding to the content stream. The content stream is processed by applying recognition technology utilizing CEMD to the content within the content stream to identify and index occurrences of identified objects. In an embodiment, the content stream is processed as the content stream is stored within a media storage device. Alternatively, the content stream is processed after the content stream is stored within the media storage device. The objects that are included within the index database, are identified dynamically by the recognition technology using CEMD during processing. As the content stream is processed, an entry for each object is generated within the index database. In some embodiments, each entry includes an object identifier and corresponding locations of that object. The locations reference where the particular content is stored within the media storage device. Once the content index database is generated, it is able to then be used to quickly locate and navigate to specific occurrences of content and objects within the content stream. The objects that are able to be identified and indexed include any identifiable information within a content stream, including shapes, objects, events and movements within video streams. In some embodiments, the content index database is stored on the same media storage device as the content stream.

Figure 4:
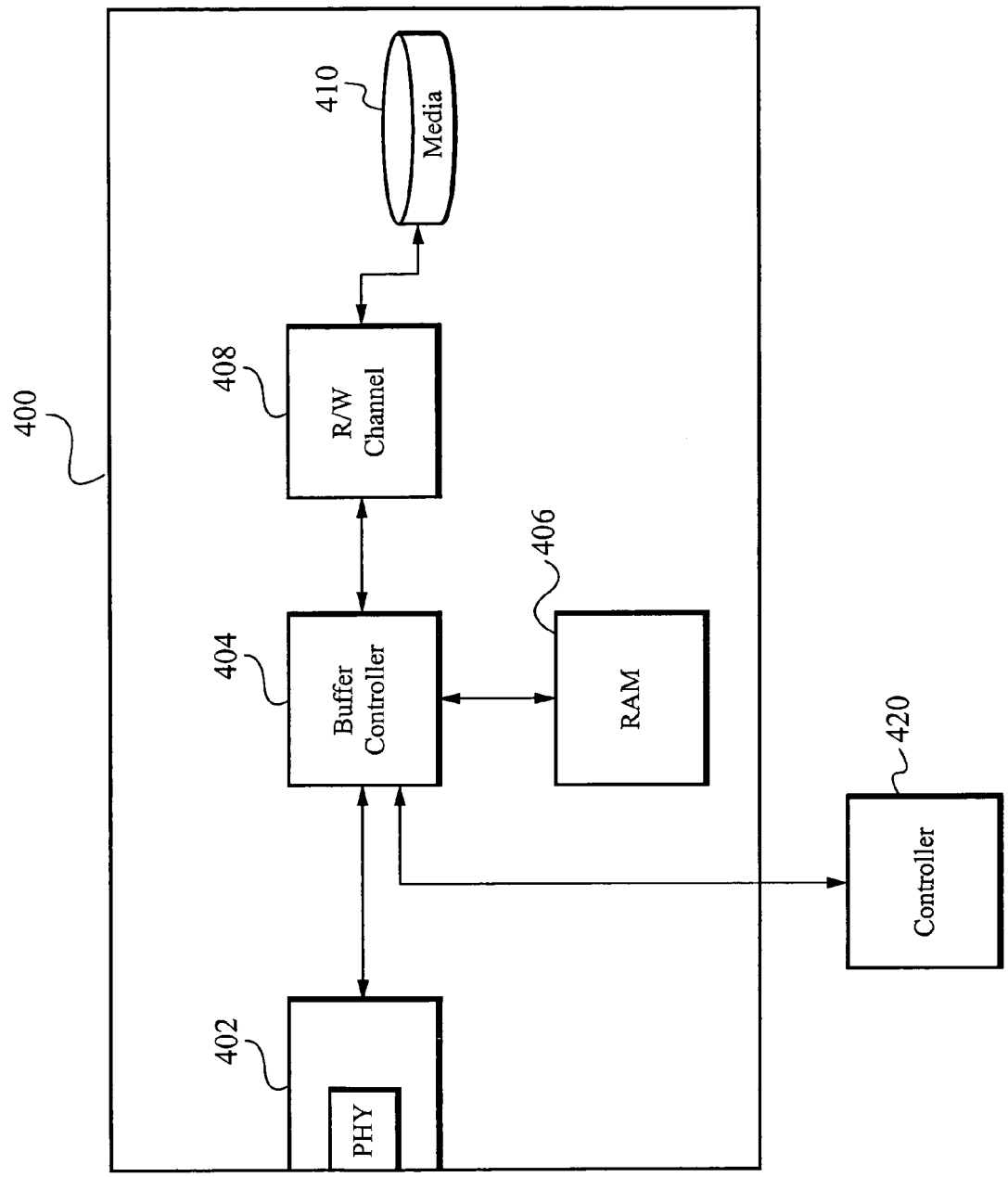
FIG. 4 illustrates a block diagram of a media storage device with external controller operating according to the present invention.

A media storage device with external controller is illustrated in FIG. 4. The media storage device 400 includes an interface circuit 402 for sending communications to and receiving communications from other devices coupled to the media storage device 400. The interface circuit 402 is coupled to a buffer controller 404. The buffer controller 404 is also coupled to a RAM 406 and to a read/write channel circuit 408. The read/write channel circuit 408 is coupled to media 410 on which data is stored within the media storage device 400. The read/write channel circuit 408 controls the storage operations on the media 410, including reading data from the media 410 and writing data to the media 410. An external controller 420 is coupled to the buffer controller 404 for controlling the processing, classifying and indexing of data streams stored on the media 410.

As the stream is processed, the recognition engine using CEMD within the controller 420 analyzes the content within the content stream to identify the appropriate objects within the content stream. As described above, the appropriate objects are dynamically identified by the recognition engine during processing. As appropriate objects within the content stream are identified, the occurrence of those identified objects within the content stream is then recorded within an index database. Once the content stream is processed and the index database is generated, the user then has the capability to jump to locations within the content stream where the desired object occurs, for viewing or editing the content stream.

Figure 5:
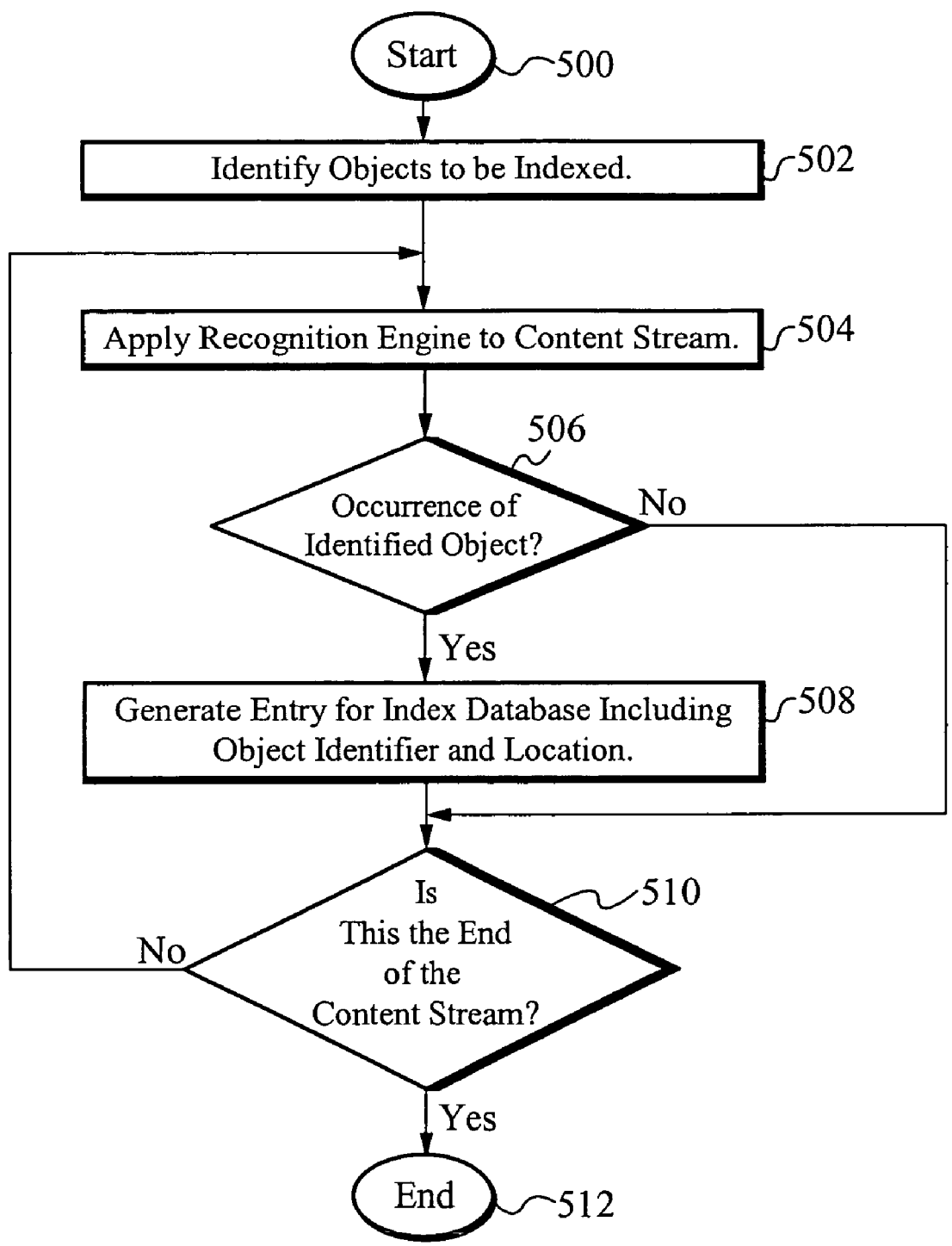
FIG. 5 illustrates a flowchart showing the steps implemented by the controller and the media storage device during processing of a content stream to generate an index database.

A flowchart showing the steps implemented in some embodiments by the controller 420 and the media storage device 400 during processing of a content stream to generate an index database is illustrated in FIG. 5. The process starts at the step 500. At the step 502, the objects to be indexed and included in the index database are identified. As described above, this identification is performed manually by the user or dynamically by the recognition technology using CEMD during processing. At the step 504, the recognition engine or recognition technology is then applied to the content stream to analyze the content stream and determine the occurrence of identified objects within the content stream.

At the step 506, it is determined whether the content within the content stream that is currently being analyzed includes an identified object. If the content currently being analyzed does include an identified object, then at the step 508, an entry is generated for the index database, including the object identifier entry within the object category and an entry identifying the corresponding location of the content within the location category. After the generation of the entry for the index database at the step 508, or if it is determined at the step 506, that the content currently being analyzed does not include an identified object, it is then determined at the step 510, if there is more content within the content stream, or if this is the end of the content stream. If it is determined that the content stream has not yet been fully processed, then the process jumps back to the step 504, to continue processing the content stream. If it is determined at the step 510 that all of the content stream has been processed, then the process ends at the step 512.

Figure 6:
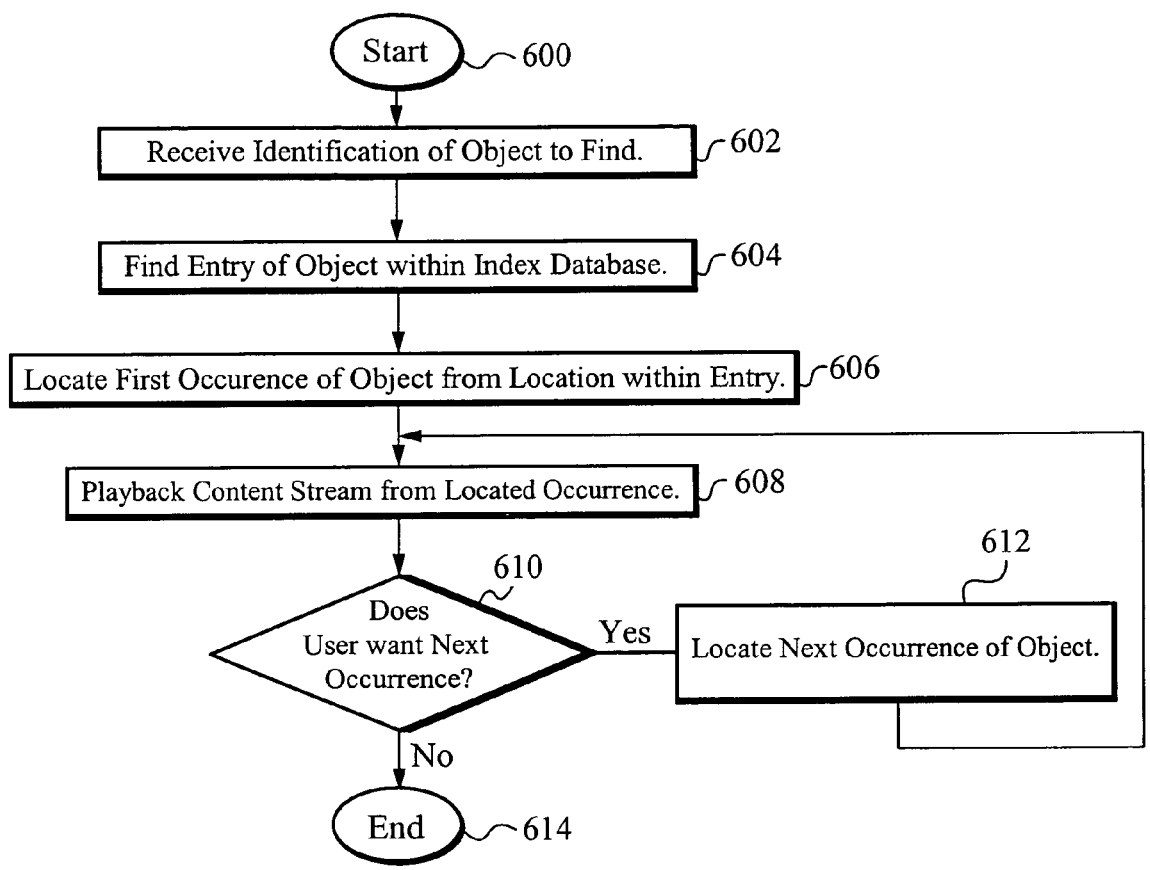
FIG. 6 illustrates a flowchart showing the steps implemented by the controller and the media storage device during playback of a content stream.

A flowchart showing the steps implemented in some embodiments by the controller 420 and the media storage device 400 during playback of a content stream, that has a corresponding index database, is illustrated in FIG. 6. The process starts at the step 600. At the step 602, a user identifies an object that they would like to locate within the content stream. At the step 604, the entry corresponding to the identified object is located within the index database and the location of the first occurrence of the object is targeted, using the entries from the object category and the location category. At the step 606, the first occurrence of the object is located within the content stream. At the step 608, this occurrence of the object is then played back for the user. At the step 610, it is then determined if the user wants the next occurrence of the object located and played back. If the user does want the next occurrence of the object located and played back, then the next occurrence of the object is located at the step 612. The process then jumps to the step 608 to playback this next occurrence. If it is determined at the step 610 that the user does not want the next occurrence of the object located and played back, the process then ends at the step 614.

As an example of the operation of the content recognition system and index database of the present invention, a user records a video of their child's birthday on a tape within a video recorder. This video includes audio and video components. The video is then recorded from the tape to a media storage device 400. Under the control of the controller 420 in conjunction with the media storage device 400, the video is processed to generate the index database by applying recognition technology including CEMD to the video components to determine each occurrence of an identified object within the content stream. As described above, this processing occurs either as the video is recorded on the media storage device 400, if the user's system has the processing capability to perform the processing online, or after the video is stored on the media storage device 400. During processing the video is analyzed to determine each occurrence of an identified object. As an occurrence of an identified object is found within the video, an entry corresponding to that occurrence is then added to the index database. For example, if the user identifies that they want every occurrence of a birthday cake within the video indexed, the recognition technology is then applied to the video content stream to determine every occurrence of the birthday cake within the video. These occurrences are identified and indexed within the index database, as described above. If the user then wants to view these occurrences or edit the video based on these occurrences, the system will utilize the index database to playback these occurrences of the birthday cake within the video or edit the video based on the occurrences of the birthday cake within the video.

Alternatively, instead of generating an index database, a search system is implemented so that a user is able to request a search for something like a birthday cake, the system searches through the video and the images/video involving a birthday cake are queued to be viewed.

CEMD is utilized in a number of applications but generally is utilized to measure distance or dissimilarity between two distributions of points in a space for which a ground distance is given. Furthermore, unlike EMD, CEMD is able to utilize compression to permit closer matching of images corresponding to a human perspective of what images are similar. CEMD is useful to permit better searching on the Internet for images, such as CBIR. CEMD is also usable in conjunction with home audio/video systems to locate specific images. Other technologies are able to implement for better comparisons of data. By providing better image recognition, CEMD improves the abilities of any implementation that requires image comparison.

In operation, CEMD improves the image comparison capabilities of whatever system it is utilized with. CEMD implements a modified version of the underlying EMD functionality, and adds a level of compression when necessary to more accurately match similar images. As shown above, when two images are similar to the human eye, but are technically dissimilar because of mathematical idiosyncrasies, CEMD is able to much better compare the images like a human would. When implemented with the aforementioned technologies or any other technology that would benefit from CEMD, CEMD functions by comparing the distance and weight of holes and earth between two images and then further implements a compression scheme to compensate when needed. For example, when a user performs an image search and selects an image to find, CEMD ensures that the search results in the most closely related images. CEMD is an extremely useful addition to any tool implementing image comparison.

In alternative embodiments, other color models are utilized besides CIE L*a*b*.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for comparing two images comprising:
   a. a first image;
   b. a second image to be compared with the first image; and
   c. a program stored on a computer readable memory to determine a compressible earth mover's distance to compare the first image with the second image, wherein the compressible earth mover's distance is calculated by compressing one or more earths and one or more holes when appropriate and determining the work required to move the one or more earths to the one or more holes wherein the one or more earths and the one or more holes correspond to colors of the first image and the second image.

2. The system as claimed in claim 1 wherein a keyword is used to determine the second image to compare.

3. The system as claimed in claim 1 wherein the second image is selected by a user.

4. The system as claimed in claim 1 wherein the shorter the compressible earth mover's distance, the more similar the first image and the second image are.

5. The system as claimed in claim 1 wherein the first image and the second image are compared over the Internet.

6. The system as claimed in claim 1 wherein the first image and the second image are compared on a computing device selected from the group consisting of a personal computer, laptop, digital camera, digital camcorder, handheld, iPod® and home entertainment system.

7. A method of comparing on a computing device a first image with a second image, wherein comparing comprises calculating a compressible earth mover's distance by compressing one or more earths and one or more holes when appropriate and determining the work required to move the one or more earths to the one or more holes wherein the one or more earths and the one or more holes correspond to colors of the first image and the second image.

8. The method as claimed in claim 7 wherein a keyword is used to determine the second image to compare.

9. The method as claimed in claim 7 wherein the second image is selected by a user.

10. The method as claimed in claim 7 wherein the shorter the compressible earth mover's distance, the more similar the first image is to the second image.

11. The method as claimed in claim 7 wherein comparing occurs via the Internet.

12. The method as claimed in claim 7 wherein comparing occurs on a computing device selected from the group consisting of a personal computer, laptop, digital camera, digital camcorder, handheld, iPod® and home entertainment system.

13. A system for locating data comprising:
  a. an image;
  b. one or more sets of data; and
  c. a program stored on a computer readable memory to search for the image wherein the search determines a compressible earth mover's distance to compare the image with the one or more sets of data, further wherein the compressible earth mover's distance is calculated by compressing one or more earths and one or more holes when appropriate and determining the work required to move the one or more earths to the one or more holes wherein the one or more earths and the one or more holes correspond to colors of the image and the one or more sets of data.

14. The system as claimed in claim 13 wherein the one or more sets of data are selected from the group consisting of images and videos.

15. The system as claimed in claim 13 wherein the program uses a keyword to determine the image to compare.

16. The system as claimed in claim 13 wherein the program uses the image selected by a user to compare.

17. The system as claimed in claim 13 wherein the program retrieves the one or more sets of data which are similar to the image.

18. The system as claimed in claim 17 wherein the program lists the one or more sets of data according to similarity to the image.

19. The system as claimed in claim 18 wherein the smaller the compressible earth mover's distance, the more similar the image is to the one or more sets of data.

20. The system as claimed in claim 13 wherein the program searches over the Internet.

21. The system as claimed in claim 13 wherein the program searches on a computing device selected from the group consisting of a personal computer, laptop, digital camera, digital camcorder, handheld, iPod® and home entertainment system.

22. A method of locating one or more images using a computing device comprising:
  a. selecting a first image to search for;
  b. comparing the first image with one or more second images, wherein comparing comprises calculating a compressible earth mover's distance by compressing one or more earths and one or more holes when appropriate and determining the work required to move the one or more earths to the one or more holes wherein the one or more earths and the one or more holes correspond to colors of the first image and the one or more second images; and
  c. retrieving the one or more second images that are similar to the first image.

23. The method as claimed in claim 22 further comprising representing the first image and the one or more second images in a color model.

24. The method as claimed in claim 23 wherein the color model is CIE L*a*b*.

25. The method as claimed in claim 22 wherein selecting comprises entering in a keyword upon which an image matching that keyword is utilized to compare.

26. The method as claimed in claim 22 wherein selecting is performed by a user.

27. The method as claimed in claim 22 further comprising listing the one or more second images according to similarity to the first image.

28. The method as claimed in claim 26 wherein a smaller compressible earth mover's distance means a higher similarity between the first image and the one or more second images.

29. The method as claimed in claim 22 wherein comparing and retrieving occurs via the Internet.

30. The method as claimed in claim 22 wherein comparing and retrieving occurs on a computing device selected from the group consisting of a personal computer, laptop, digital camera, digital camcorder, handheld, iPod® and home entertainment system.

31. A method of locating one or more images using a computing device comprising:
  a. selecting a first image to search for;
  b. comparing the first image with one or more second images stored in a database;
  c. calculating a compressible earth mover's distance between the first image and the one or more second images by compressing one or more earths and one or more holes when appropriate and determining the work required to move the one or more earths to the one or more holes wherein the one or more earths and the one or more holes correspond to colors of the first image and the one or more second images;
  d. retrieving the one or more second images wherein the compressible earth mover's distance is within a specified limit; and
  e. listing the one or more second images in order of similarity to the first image.

32. The method as claimed in claim 31 further comprising representing the first image and the one or more second images in a color model.

33. The method as claimed in claim 32 wherein the color model is CIE L*a*b*.

34. The method as claimed in claim 31 wherein selecting comprises entering in a keyword upon which an image matching that keyword is the first image.

35. The method as claimed in claim 31 wherein selecting is performed by a user.

36. The method as claimed in claim 31 wherein a smaller compressible earth mover's distance means a higher similarity between the first image and the one or more second images.

37. The method as claimed in claim 31 wherein the one or more second images are retrieved via the Internet.

38. The method as claimed in claim 31 wherein the one or more second images are retrieved on a computing device selected from the group consisting of a personal computer, laptop, digital camera, digital camcorder, handheld, iPod® and home entertainment system.

39. An apparatus for processing a content stream comprising:
   a. means for processing a content stream to determine occurrences of one or more objects within the content stream, wherein the objects comprise one or more of shapes and objects, further wherein the means for processing determines a compressible earth mover's distance on a computer readable memory; and
   b. means for generating an entry coupled to the means for processing for generating an entry for each occurrence of the one or more objects, the entry including an object identifier and a corresponding location of the occurrence of the object within the content stream.

40. The apparatus as claimed in claim 39 wherein the content stream includes one or more of an audio component and a video component.

41. An apparatus to process a content stream comprising:
   a. a processing engine to process a content stream to determine occurrences of one or more objects within the content stream by determining a compressible earth mover's distance, wherein the objects comprise one or more of shapes and objects; and
   b. a controller coupled to the processing engine to generate an entry for each occurrence of the one or more objects, the entry including an object identifier and a corresponding location of the occurrence of the object within the content stream.

42. The apparatus as claimed in claim 41 wherein the content stream includes one or more of an audio component and a video component.

43. A method of computing the distance between a first and a second image on a computing device comprising:
   a. representing the first image in a color model;
   b. representing the second image in the color model;
   c. determining the size of one or more earths, wherein the one or more earths are derived from the first image;
   d. determining the size of one or more holes, wherein the one or more holes are derived from the second image;
   e. moving the one or more earths to the one or more holes;
   f. compressing the one or more earths to minimize the distance between the first image and the second image;
   g. compressing the one or more holes to minimize the distance between the first image and the second image; and
   h. determining a work amount based on the distance between the first image and the second image.

44. The method as claimed in claim 43 wherein the color model is CIE L*a*b*.

45. The method as claimed in claim 43 further comprising plotting the first image and the second image to the color model.

* * * * *

UNITED STATES PATENT AND TRADEMARK OFFICE
CERTIFICATE OF CORRECTION

PATENT NO. : 7,602,976 B2
APPLICATION NO. : 11/356880
DATED : October 13, 2009
INVENTOR(S) : Hovden It is certified that error appears in the above-identified patent and that said Letters Patent is hereby corrected as shown below:

<u>IN THE SPECIFICATION</u>

In the equation, at column 7, line 7, please replace "$x_i$" with "$y_j$" and replace the closing brace with a right parenthesis, ")", to match the opening parenthesis in the equation "$CEMD = \min(...$" which begins at column 6, line 63, so that the equation term correctly reads

--

$$+\sum_{j \in J} \left\{ \begin{array}{l} 0, if \sum_{i \in I} e_{ij} \leq y_j \\ \alpha \left( \dfrac{\sum_{i \in I} e_{ij}}{y_j} - 1 \right), otherwise \end{array} \right)$$

--

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,602,976 B2  Page 1 of 1
APPLICATION NO. : 11/356880
DATED : October 13, 2009
INVENTOR(S) : Gunnar Hovden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Fifth Day of October, 2010

David J. Kappos
*Director of the United States Patent and Trademark Office*